United States Patent
Campbell et al.

(10) Patent No.: US 9,166,518 B2
(45) Date of Patent: Oct. 20, 2015

(54) ROTOR TEMPERATURE ESTIMATION FOR AN ELECTRIC VEHICLE

(75) Inventors: Mengwei Campbell, Torrance, CA (US); Bon Ho Bae, Torrance, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 13/170,082

(22) Filed: Jun. 27, 2011

(65) Prior Publication Data

US 2012/0330483 A1 Dec. 27, 2012

(51) Int. Cl.
*H02P 29/00* (2006.01)
*H02P 23/14* (2006.01)

(52) U.S. Cl.
CPC ............ *H02P 29/0061* (2013.01); *H02P 23/14* (2013.01); *B60L 2240/425* (2013.01); *Y02T 10/642* (2013.01)

(58) Field of Classification Search
CPC ............ H02P 29/0061–29/0077; H02P 23/14; B60L 2240/425; B60W 2510/087; Y02T 10/642
USPC ............................................. 361/23; 701/22
See application file for complete search history.

(56) References Cited

U.S. PATENT DOCUMENTS

| | | | |
|---|---|---|---|
| 4,083,001 A * | 4/1978 | Paice | 324/754.29 |
| 4,413,325 A * | 11/1983 | Elfner et al. | 702/132 |
| 4,544,982 A * | 10/1985 | Boothman et al. | 361/96 |
| 4,547,826 A * | 10/1985 | Premerlani | 361/25 |
| 4,743,818 A * | 5/1988 | Quayle et al. | 318/473 |
| 4,897,584 A * | 1/1990 | Grutzmacher et al. | 318/471 |
| 4,939,437 A * | 7/1990 | Farag et al. | 318/473 |
| 5,086,264 A * | 2/1992 | Kelledes et al. | 318/798 |
| 5,153,506 A * | 10/1992 | Trenkler et al. | 374/163 |
| 5,220,478 A * | 6/1993 | Innes et al. | 361/93.2 |
| 5,396,161 A * | 3/1995 | Doi et al. | 318/807 |

(Continued)

FOREIGN PATENT DOCUMENTS

CN 201281637 Y 7/2009

OTHER PUBLICATIONS

Mellor, P.H., et al. "Lumped parameter thermal model for electrical machines of TEFC design," IEEE Proceedings on Electric Power Applications, Sep. 1991, pp. 205-218, vol. 138, No. 5.

(Continued)

*Primary Examiner* — Fadey Jabr
*Assistant Examiner* — Courtney Heinle
(74) *Attorney, Agent, or Firm* — Ingrassia Fisher & Lorenz, P.C.

(57) ABSTRACT

In accordance with exemplary embodiments, rotor temperature estimation is provided for estimating rotor temperatures of an electric motor in an electric vehicle. A method comprises estimating a rotor temperature in a controller for an electric motor of a vehicle using a fast-mode rotor temperature estimator for a time interval, and then deactivating the fast-mode rotor temperate estimator after the time interval and activating a normal-mode rotor temperature estimator in the controller for the electric motor of the vehicle. A system comprises an electric motor, a resistance rotor temperature estimator including a limit value limiting a temperature estimate increase for temperature estimates, and a controller for the electric motor, which uses the temperature estimate and is configured to temporarily increase the limit value of the resistance rotor temperature estimator providing a fast-mode rotor temperature estimate.

12 Claims, 6 Drawing Sheets

(56) References Cited

U.S. PATENT DOCUMENTS

| | | | | |
|---|---|---|---|---|
| 5,418,677 | A * | 5/1995 | Engel | 361/25 |
| 5,436,784 | A * | 7/1995 | Schweitzer et al. | 361/25 |
| 5,510,687 | A * | 4/1996 | Ursworth et al. | 318/727 |
| 5,525,881 | A * | 6/1996 | Desrus | 318/471 |
| 5,539,601 | A * | 7/1996 | Farag | 361/23 |
| 5,977,742 | A * | 11/1999 | Henmi | 318/801 |
| 6,042,265 | A * | 3/2000 | Kliman et al. | 374/152 |
| 6,283,631 | B1 * | 9/2001 | Gousset et al. | 374/152 |
| 6,294,888 | B1 * | 9/2001 | Becker | 318/471 |
| 6,504,358 | B1 * | 1/2003 | Maier et al. | 374/185 |
| 6,870,348 | B2 | 3/2005 | Mijalkovic et al. | |
| 7,099,793 | B2 * | 8/2006 | Rechberger | 702/130 |
| 7,112,941 | B2 * | 9/2006 | Chrostowski | 318/801 |
| 7,161,778 | B2 * | 1/2007 | Zocholl | 361/25 |
| 7,265,954 | B2 * | 9/2007 | Hikawa et al. | 361/29 |
| 7,362,550 | B2 * | 4/2008 | Groening et al. | 361/27 |
| 7,694,538 | B2 * | 4/2010 | Thorn et al. | 68/12.16 |
| 7,769,552 | B2 * | 8/2010 | Colby et al. | 702/65 |
| 7,791,328 | B2 * | 9/2010 | Sheahan | 324/76.11 |
| 8,013,565 | B2 * | 9/2011 | Miura | 318/811 |
| 8,494,801 | B2 * | 7/2013 | Pushkolli et al. | 702/99 |
| 2004/0206341 | A1 * | 10/2004 | Clarkson et al. | 123/564 |
| 2004/0257011 | A1 * | 12/2004 | Rechberger | 318/139 |
| 2004/0264074 | A1 * | 12/2004 | Schweitzer et al. | 361/23 |
| 2009/0189561 | A1 * | 7/2009 | Patel et al. | 318/806 |
| 2009/0218980 | A1 * | 9/2009 | Bilac et al. | 318/778 |
| 2009/0284202 | A1 * | 11/2009 | Miura | 318/473 |
| 2010/0156338 | A1 * | 6/2010 | Lu et al. | 318/798 |
| 2011/0050141 | A1 | 3/2011 | Yeh et al. | |
| 2011/0119014 | A1 * | 5/2011 | Pushkolli et al. | 702/99 |
| 2011/0140646 | A1 | 6/2011 | Campbell et al. | |
| 2011/0144843 | A1 * | 6/2011 | Wu et al. | 701/22 |
| 2011/0279074 | A1 * | 11/2011 | Yeh et al. | 318/432 |
| 2011/0285342 | A1 * | 11/2011 | Campbell et al. | 318/798 |
| 2012/0007532 | A1 * | 1/2012 | Baglino et al. | 318/473 |
| 2012/0133313 | A1 * | 5/2012 | Xie et al. | 318/473 |
| 2012/0323430 | A1 * | 12/2012 | Nakamura et al. | 701/22 |
| 2013/0093372 | A1 * | 4/2013 | Thyagarajan | 318/400.04 |
| 2013/0207589 | A1 * | 8/2013 | Margner et al. | 318/717 |

OTHER PUBLICATIONS

Asaii, B., et al. "A new thermal model for EV induction machine drives," IEEE Power Electronics in Transportation, Oct. 1996, pp. 175-182.

Gao, Z., et al. "A sensorless adaptive stator winding temperature estimator for mains-fed induction machines with continuous-operation periodic duty cycles," IEEE Transactions on Industry Applications, Sep./Oct. 2008, pp. 1533-1542, vol. 44, No. 5.

Briz, F., et al. "Temperature estimation in inverter-fed machines using high-frequency carrier signal injection," IEEE Transactions on Industry Applications, May/Jun. 2008, pp. 799-808, vol. 44, No. 3.

Al-Tayie, J.K., et al. "Estimation of speed, stator temperature and rotor temperature in cage induction motor drive using the extended kalman filter algorithm," IEEE Proceedings in Electric Power Applications, Sep. 1997, pp. 301-309, vol. 144, No. 5.

Colby, R.S., et al. "A model reduction perspective on thermal models for induction machine overload relays," IEEE Transactions on Industrial Electronics, Oct. 2008, pp. 3525-3534, vol. 55, No. 10.

Yeh, C-C., et al. "Electric Motor Stator Winding Temperature Estimation Systems and Methods," U.S. Appl. No. 12/778,733, filed May 12, 2010.

* cited by examiner

ROTOR TEMPERATURE ESTIMATION FOR AN ELECTRIC VEHICLE

TECHNICAL FIELD

The technical field generally relates to systems and methodologies for a drive system for electric and hybrid electric vehicles, and more particularly, to systems and methodologies for estimating rotor temperature of an electric motor in an electric vehicle.

BACKGROUND

Electric and hybrid vehicles typically include alternating current (AC) electric motor(s) that are driven by a direct current (DC) power source, such as a high voltage battery pack. The battery pack provides direct current to inverter module(s), which perform a rapid switching function to convert the DC power to AC power which drives the AC electric motor(s).

The AC electric motors typically include a rotor and stator assembly. Proper control of the AC electric motors depends upon a number of parameters including the temperature of the rotor and stator during operation. When the AC electric motors are "started" (that is, turned on, commonly referred to as "Key On"), it is common to initially estimate the rotor temperature as being approximately equal to the stator temperature. Normally, this initial rotor temperature estimate works well and rotor temperature tracking or estimation circuitry can then accurately track temperature changes in the rotor during operation. However, in the event the AC electric motors are turned off (commonly referred to as "Key Down") and then quickly back on (commonly referred to as a "hot start"), the rotor temperate could be as much as 80° C. above the stator temperature. Accordingly, estimating the rotor temperature to be about that of the stator could lead to overheating if full torque is applied to the electric motor, since typical rotor temperature estimation circuits respond at a slow rate of change.

Accordingly, it is desirable to provide a simple, reliable and cost effective solution to rotor temperature estimation following "hot starts" in electric or hybrid electric vehicles. Additionally, other desirable features and characteristics of the present invention will become apparent from the subsequent description taken in conjunction with the accompanying drawings and the foregoing technical field and background.

BRIEF SUMMARY

In accordance with an exemplary embodiment, a method for rotor temperature estimation is provided for estimating rotor temperature of an electric motor in an electric vehicle. The method comprises estimating rotor temperature in a controller for an electric motor of a vehicle using a fast-mode rotor temperature estimator for a time interval and then deactivating the fast-mode rotor temperate estimator after the time interval and activating a normal-mode rotor temperature estimator in the controller for the electric motor of the vehicle.

In accordance with an exemplary embodiment, a method for rotor temperature estimation is provided for estimating rotor temperature of an electric motor in an electric vehicle. The method comprises controlling an electric motor via a vehicle controller having a rotor temperature estimator with a limit value limiting a temperature estimate increase for a rotor of the electric motor. The limit value of the rotor temperature estimator is temporarily increased to provide fast-mode temperature estimation. Then, the limit value of the rotor temperature estimator to is reduced to restore normal-mode temperature estimation.

In accordance with another exemplary embodiment, a system is provided for estimating rotor temperature of an electric motor in an electric vehicle. The system comprises an electric motor, a thermal model rotor temperature estimator providing a first temperature estimate for a rotor of the electric motor, a resistance rotor temperature estimator providing a second temperature estimate for the rotor of the electric motor, the resistance rotor temperature estimator including a limit value limiting a temperature estimate increase for second temperature estimate and a controller for the electric motor using the first temperature estimate or the second temperature estimate. The controller is configured to temporarily increase the limit value of the resistance rotor temperature estimator providing a fast-mode rotor temperature estimate.

DESCRIPTION OF THE DRAWINGS

The inventive subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-7 are merely illustrative and may not be drawn to scale.

Figure 1:
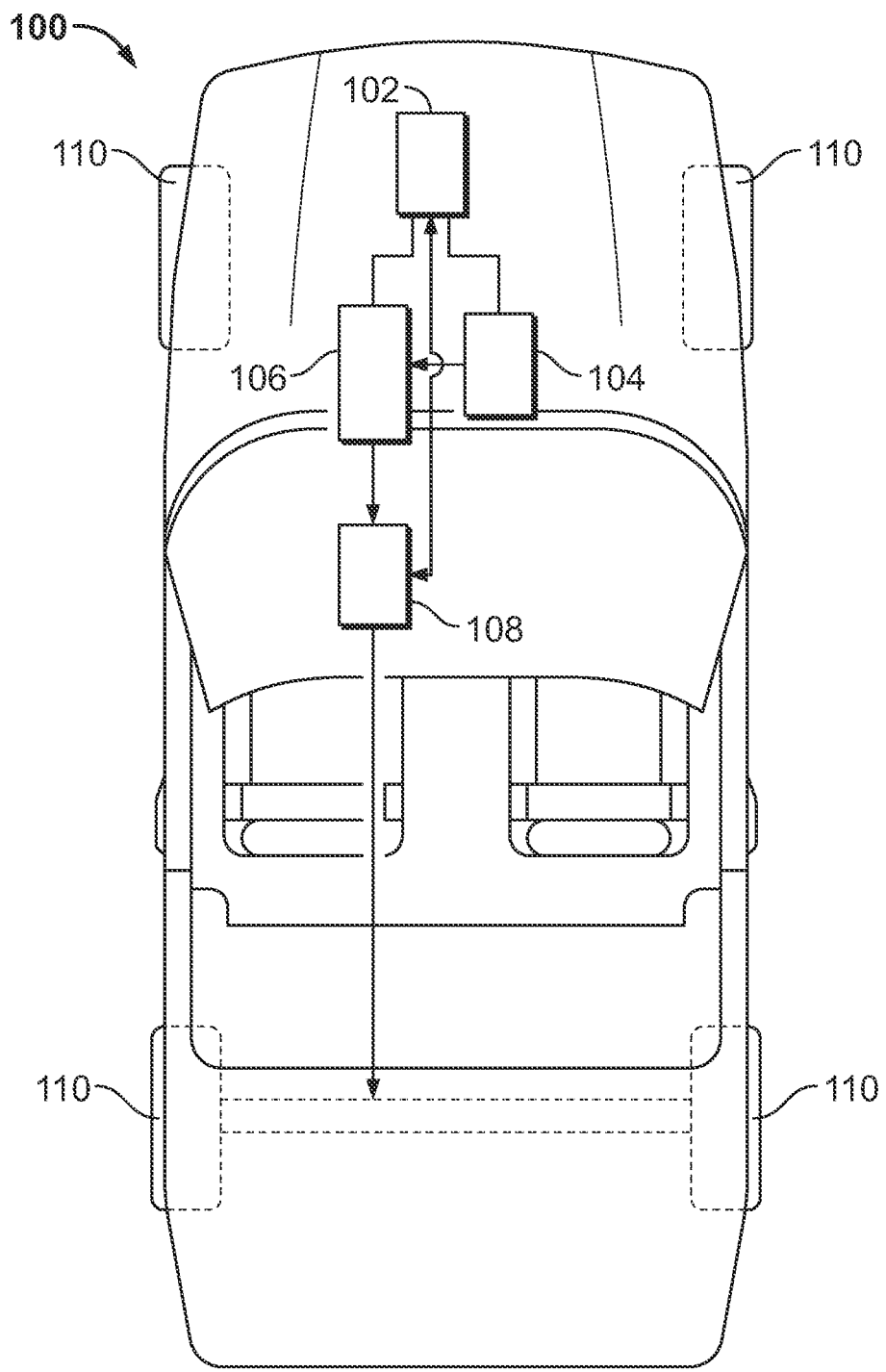
FIG. 1 is an illustration of a vehicle suitable for using exemplary embodiments of the present disclosure.

FIG. 1 is a simplified schematic representation of an embodiment of a vehicle 100 according to the present disclosure. Although vehicle 100 is illustrated as a purely electric vehicle, the techniques and concepts described herein are also applicable to hybrid electric vehicles. The illustrated embodiment of vehicle 100 includes, without limitation: a vehicle control module 102 coupled to an onboard generator 104; an onboard energy storage system 106; and an electric propulsion system 108 driving wheels 110.

The vehicle control module 102 may include any type of processing element or vehicle controller, and may be equipped with nonvolatile memory, random access memory (RAM), discrete and analog input/output (I/O), a central processing unit, and/or communications interfaces for networking within a vehicular communications network. In an electric vehicle embodiment, onboard generator 104 may comprise a small gas (or other liquid fuel) powered generator sufficient to charge the energy storage system 106 if needed. In a hybrid electric vehicle embodiment, generator 104 may be powered by or part of the vehicle gas (or other fuel) engine used to propel the vehicle. Onboard energy storage system 106 may be realized as a rechargeable battery pack having a single battery module or any number of individual battery modules. Onboard energy storage system 106 provides electrical energy that enables electric propulsion system 108 to provide traction power to wheels 110.

While FIG. 1 is a schematic diagram that depicts various electrical and mechanical connections and couplings in a very simplified manner for ease of description, an actual embodiment of vehicle 100 will of course utilize additional physical components and devices that are well known in the automotive industry. For example, numerous conventional accessories would be included in a commercially available vehicle such as window or mirror defoggers, anti-lock brake systems, traction or stability systems, lighting systems, warning systems (e.g., horn), turn indicators (signals), air conditioning, heated seats, video/audio systems, and power outlet ports for user devices (collectively, accessories). Also, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines, such as, for example, a gasoline or diesel fueled combustion engine, a flex fuel vehicle (FFV) engine (i.e., an engine that uses a mixture of gasoline and alcohol) or a gaseous compound (e.g., hydrogen and/or natural gas) fueled engine.

Figure 2:
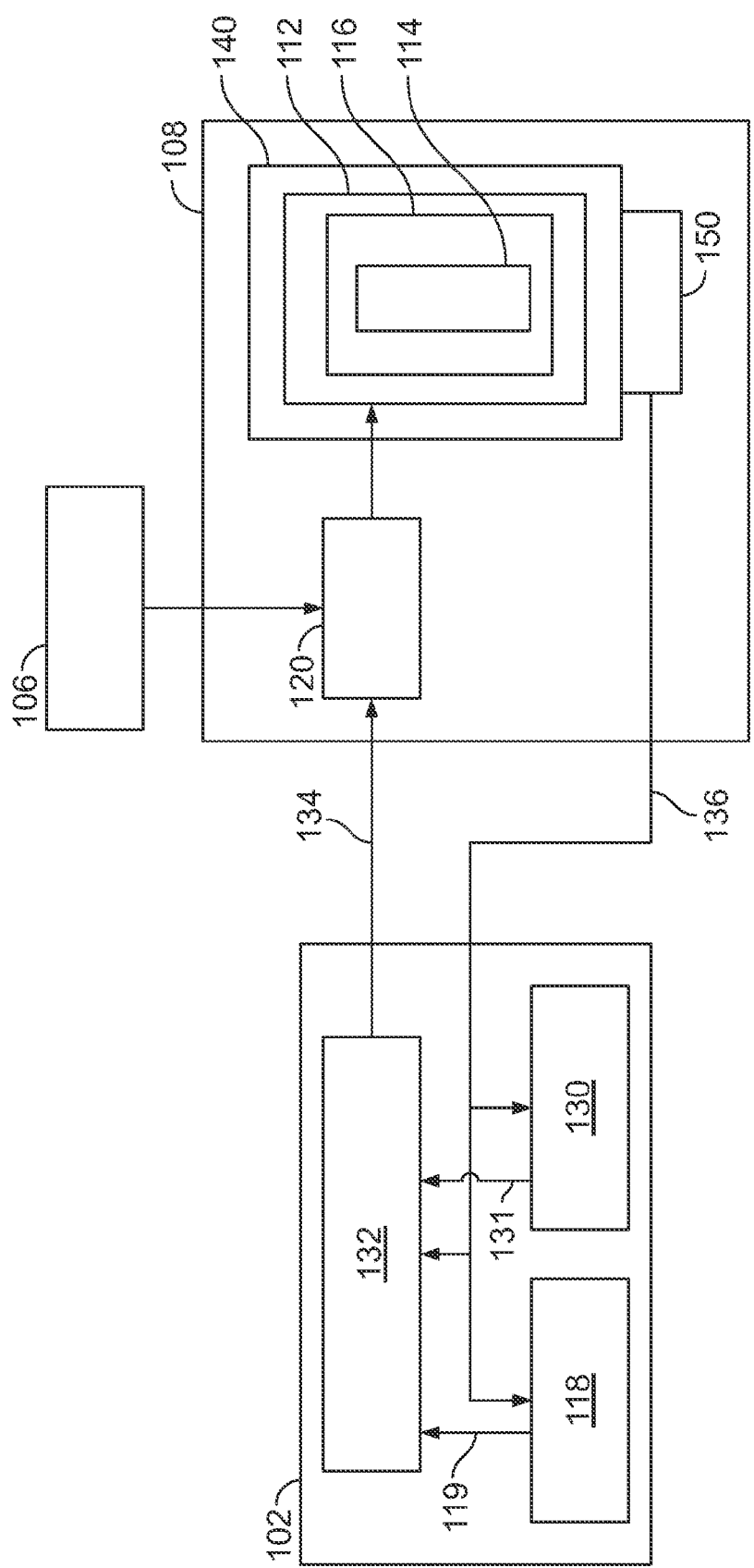
FIG. 2 is a more detailed illustration of components of the vehicle of FIG. 1.

FIG. 2 is a more detailed block diagram of selected components of the vehicle 100 in accordance with an exemplary embodiment. In one exemplary embodiment, the electric propulsion system 108 includes an AC induction motor 112 having a stator 116 and a rotor 114, an inverter assembly 120, a cooling system 140 and one or more sensors 150. The controller 102 is illustrated in more detail as including a control module 132, a thermal model rotor temperature estimator 118 and a resistance rotor temperature estimator 130. During operation, the controller 102 processes torque commands and produces reference voltages that control the inverter assembly 120 to drive the induction motor 112. The induction motor 112 produces a torque on a drive shaft (not shown) of the vehicle 100 to drive the wheels 110 (FIG. 1). The controller 102 produces the reference voltages that control the inverter assembly 120 based in part on rotor tempera-ture estimations. In low torque conditions (e.g., below 5 nm), the controller uses the thermal model rotor temperature estimator 118 for determining rotor temperature via input 119. In high torque conditions (e.g., above 5 nm), the controller uses the resistance rotor temperature estimator 130 for determining rotor temperature via input 131.

The induction motor 112 may be a multi-phase alternating current (AC) motor that generally includes a rotor 114 and a stator 116 with windings or coils that may be grouped to correspond to operating phases. The inverter assembly 120 drives the operation of the induction motor 112 and generally includes one or more inverters, each including switches with antiparallel diodes. In various embodiments, the switches are implemented with insulated gate bipolar transistors (IGBTs), metal oxide semiconductor field effect transistors (MOSFETs), and/or the like. The windings of the stator 116 are electrically coupled between the switches of the inverter assembly 120 to receive current and generate torque in the induction motor 112. In one exemplary embodiment, the inverter assembly 120 provides alternating phase currents to drive three-phases of the induction motor 112 at varying speeds based on the input voltage ($V_{DC}$) of the power source 106 and control signals 134 from the controller 102.

A cooling system 140 with a coolant, such as motor oil, surrounds and cools the induction motor 112 during operation. The sensors 150 may include any suitable type of sensor for collecting information within the propulsion system 108 for use by the controller 102. For example, the sensors 150 may determine or otherwise derive coolant temperatures ($T_{COOLANT}$), rotor positions ($\theta_r$), rotor speeds ($\omega_r$), and other parameters used as inputs 136 for the controller 102.

Figure 3:
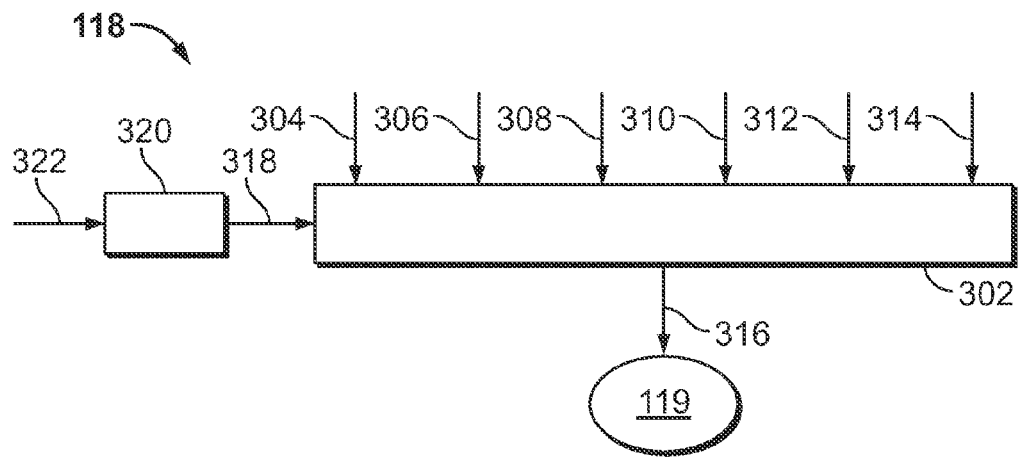
FIG. 3 is a block diagram illustrating of the operation of a thermal model estimator for estimating rotor temperature in the controller of FIG. 2 in accordance with an exemplary embodiment.

FIG. 3 is a block diagram illustrating the operation of a rotor temperature estimator using the thermal model rotor temperature estimator 118 of the controller 102 of FIG. 2 in accordance with an exemplary embodiment. As noted above, the thermal model rotor temperature estimator 118 is used in operating conditions with low torque values, e.g., at torque values less than 5 nm.

The thermal model rotor temperature estimator 118 includes a thermal model block 302 that receives or derives a number of input values for the rotor temperature estimation. The input values include the mutual inductance ($L_m$) 304, rotor inductance ($L_r$) 306, the commanded value for stator current components ($i^*_{ds}$, $i^*_{qs}$) 308, cutoff frequency of the low pass filter ($\omega_c$) 310, Laplace domain operator(s) 312, and coolant temperature ($T_{COOLANT}$) 314.

The thermal model is based on the relationship of Equation (1), as follows:

$$T_r = T_{coolant} + P_r R_{th}\left(\frac{\omega_c}{s + \omega_c}\right) \quad (1)$$

where $T_r$ 316 is the estimated temperature of the rotor; $T_{COOLANT}$ 314 is the temperature of the coolant; $R_{th}$ is the thermal resistance between the rotor and the coolant; $P_r$ is the power dissipation in the rotor; $\omega_c$ 310 is the cutoff frequency of the low pass filter, and s is the Laplace domain operator 312.

The relationship of Equation (1) may be simplified as Equation (2), as follows:

$$T_r = T_{coolant} + I_r^2 K\left(\frac{\omega_c}{s + \omega_c}\right) \quad (2)$$

where $I_r$ is the estimated rotor current, and K is a speed dependent correction factor.

Additionally, the rotor current ($I_r$) may be estimated as Equation (3), as follows:

$$I_r = \frac{L_m}{L_r} I_{qs} \quad (3)$$

where $I_{qs}$ is the stator current in the q-reference frame; $L_m$, is the mutual inductance, and $L_r$ is the rotor inductance.

Accordingly, the thermal model 302 estimates the rotor temperature ($T_r$) 316 based on the relationships in Equations (1)-(3) and a correction factor (K) 318 that may be derived from a look-up table 320 stored in the thermal model rotor temperature estimator 118 and accessed based on the rotor speed ($\omega_r$) 322. In some embodiments, interpolation (e.g., linear interpolation or other known interpolation techniques) may be used to further refine the resulting correction factor (K) between speed values. The thermal model 302 temperature estimate 316 is provided to the control module 132 as input 119 (see FIG. 2).

Figure 4:
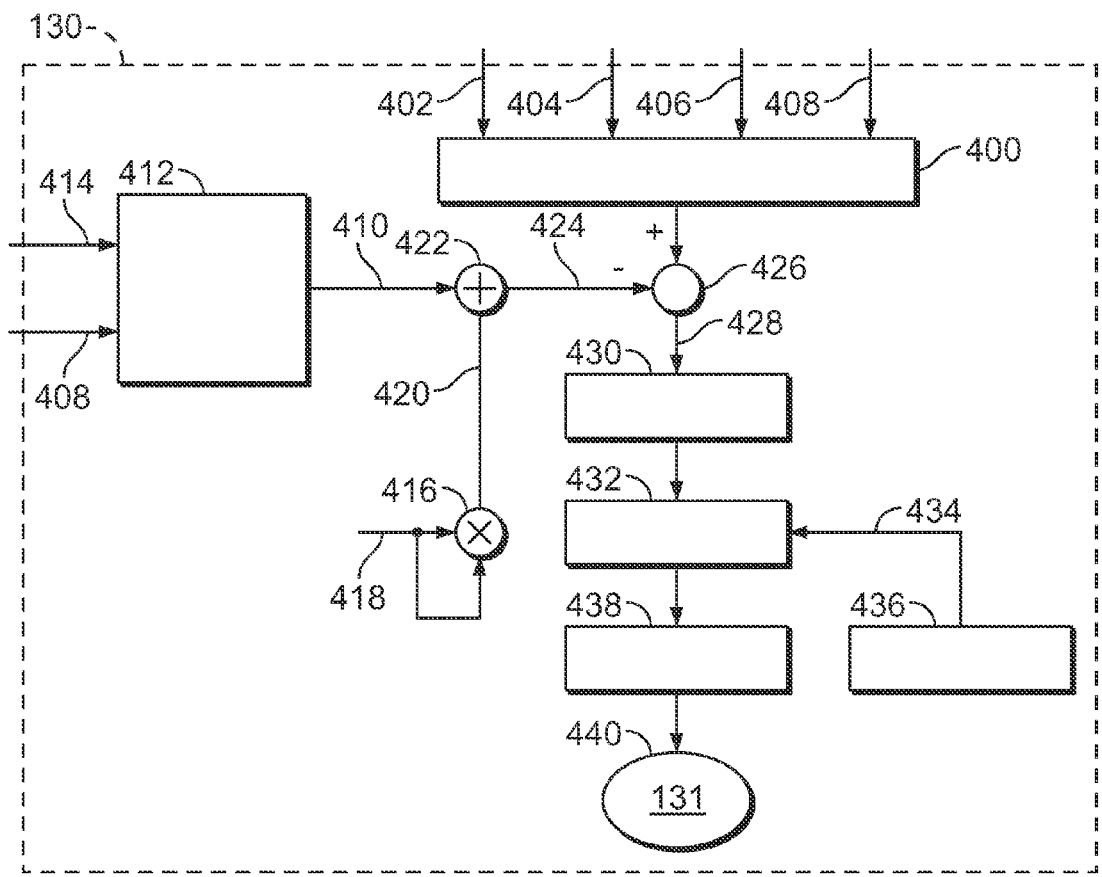
FIG. 4 is a block diagram illustrating of the operation of a resistance rotor temperature estimator for estimating rotor temperature in the controller of FIG. 2 in accordance with an exemplary embodiment.

FIG. 4 is a block diagram illustrating the operation of resistance rotor temperature estimator 130 of the controller 102 of FIG. 2 in accordance with an exemplary embodiment. As noted above, the resistance rotor temperature estimator 130 is used in operating conditions with high torque values, e.g., at torque values greater than 5 nm.

The resistance rotor temperature estimation block 400 estimates a rotor flux magnitude ($\hat{\psi}_r^2$) using internal variables such as phase currents ($i_a$, $i_b$, $i_c$) 402, voltages ($V_a$, $V_b$, $V_c$) 404, rotor slip angle ($\omega_{slip}$) 406, and rotor speed ($\omega_r$) 408. In one exemplary embodiment, these variables are provided or derived from the sensors 150 (FIG. 2) or other components of the induction motor 112 (FIG. 2). In another embodiment, the voltages ($V_a$, $V_b$, $V_c$) 404 and the phase currents ($i_a$, $i_b$, $i_c$) 402 may be the command voltages and currents (i.e., from the user of the vehicle), rather than measured or derived currents to eliminate noise content. In yet another embodiment, the voltages ($V_a$, $V_b$, $V_c$) 404 and the phase currents ($i_a$, $i_b$, $i_c$) 402 may be received or converted as dq-reference frame values (i.e., as $V_{qs}$, $V_{ds}$, and $I_{qs}$, $I_{ds}$) as is known in the art.

In one exemplary embodiment, the estimated motor flux square $\hat{\psi}_r^2$ is obtained by the following Equation (5):

$$\hat{\psi}_r^2 = \left\{ (V_q i_d - V_d i_q) - L_s \sigma \left( i_d \frac{d}{dt} i_q - i_q \frac{d}{dt} i_d + \omega_e i_d^2 + \omega_e i_q^2 \right) \right\} \frac{L_r}{\omega_e} \quad (5)$$

where $V_d$ and $V_q$ are stator commanded voltages in a synchronous reference frame, $i_d$ and $i_q$ are stator currents in a synchronous frame (e.g., in which commanded currents are preferably used), $L_s \sigma$ is an equivalent leakage inductance, $L_r$ is rotor inductance, and $\omega_c$ is stator electrical frequency.

In this exemplary embodiment, the estimated rotor flux squared tracks the actual flux squared, which may be calculated as follows in Equation (6):

$$\frac{L_r}{R_r} \frac{d\psi_{dr}}{dt} = -\psi_{dr} + L_m i_d \quad (6)$$

For the case where the rotor resistance ($R_r$) is the actual rotor resistance and estimated flux from Equation (5) accurately reflects the motor flux from equation (6), then the estimated rotor flux squared ($\hat{\psi}_r^2$) value in Equation (5) should be equal to the actual rotor flux squared ($\psi_{dr}^2$) value in Equation (6).

As seen in FIG. 4, a rotor flux square offset value ($|\psi_r|^2$) 410 is determined by accessing look up table 412 using the rotor speed ($\omega r$) 408 and the torque command (T*) 414. The flux squared offset may account for any expected differences between the estimated rotor flux squared ($\hat{\psi}_r^2$) and the actual rotor flux squared ($\psi_{dr}^2$) in light of the actual rotor resistance ($R_r$).

Additionally, in multiplier 416, a value of actual rotor flux ($\psi_{dr}$) 418 is obtained from Equation (6) and multiplied by itself. The resulting squared value ($\psi^2_{dr}$) 420 is then added (422) to the flux squared offset value $|\psi_r|^2$ 410 from the look up table 412 to generate a revised squared value of rotor flux 424. Next, the difference (426) is calculated between the revised value 424 and the estimated flux square value 2 ($\psi_{dr}^2$) from block 400.

The difference value (428) is next processed via a filter 430 (e.g., a low-pass filter) and an integrator 432 initialized with a first initial rotor resistance value (434) determined as a function of the stator temperature (436). Finally, a limit function 438 incorporates a temperature rate of change limit for the induction motor 112 (FIG. 2) in order to provide a final estimated value of rotor resistance, which is used to calculate the estimated rotor temperature (440) by Equation 7:

$$T_{est} = (R_{r\_est}/R_{r0} - 1)/0.0039 + T_0 \quad (7)$$

Where $R_{r\_est}$ is estimated rotor resistance, $T_0$ is the fixed rotor temperature. $R_{r0}$ is the measured rotor resistance at rotor temperature $T_0$. In other embodiments, different equations may be used. The estimated rotor resistance and temperature are provided to the control module 132 of FIG. 2 (as input 131) from the resistance rotor temperature estimator 130.

Traditionally, a fixed limit value (for example, limit the estimated rotor resistance change corresponding to 4° C. per second rotor temperature change) has been used for the limit function 438. However, embodiments of the present disclosure contemplate increasing or varying the limit value to allow for fast-mode temperate estimation as well as a normal-mode temperature estimation using the nominal (or normal) value. As will become apparent below, the fast-mode temperature estimation compensates for "hot start" situations, offering an advantage over conventional temperature estimation approaches.

Figure 5:
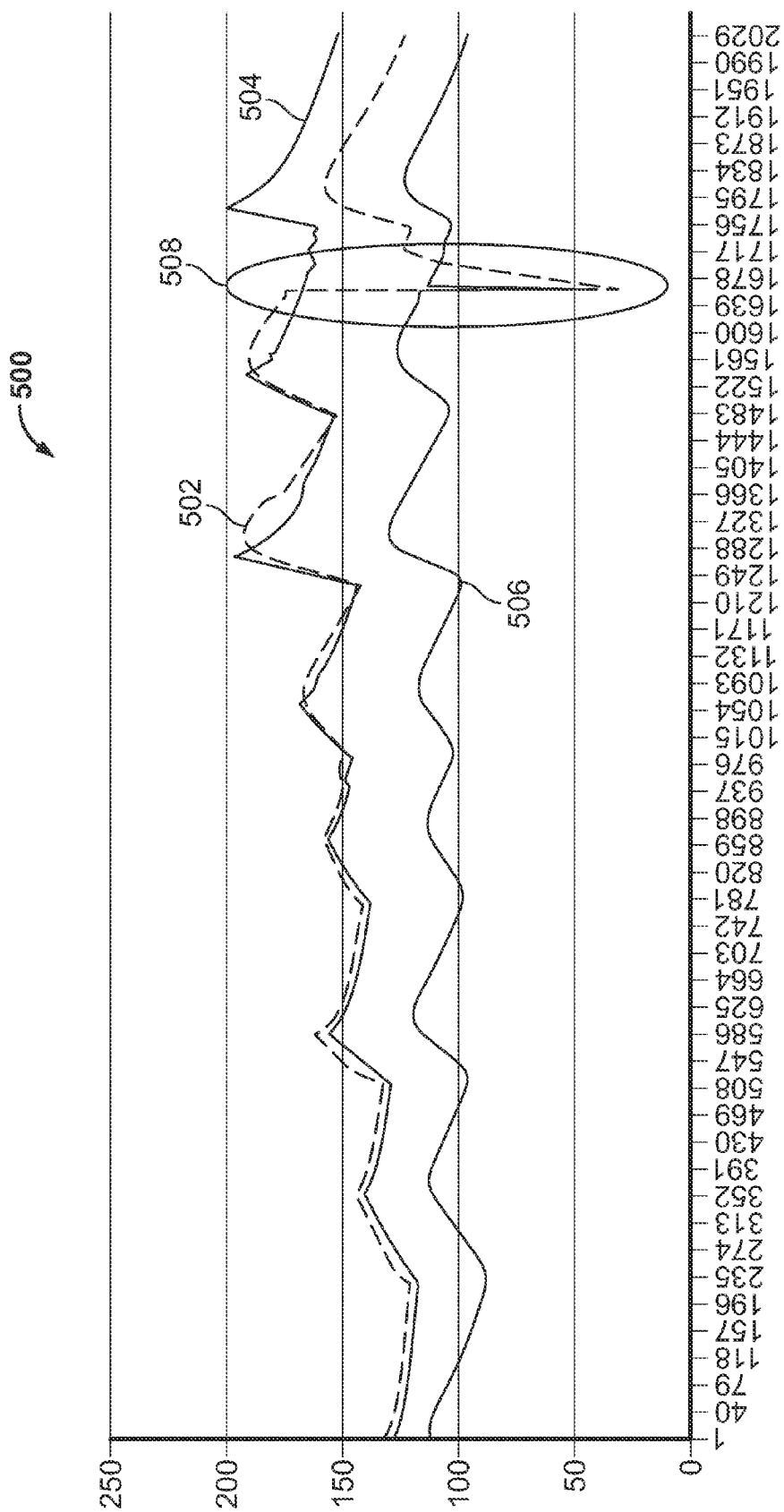
FIG. 5 is a chart illustrating the rotor/stator temperature variation during a hot start.

Referring now to FIG. 5, there is shown a chart 500 illustrating estimated rotor temperature 502, measured rotor temperature 504 and stator temperature 506 for conventional rotor temperature estimation. From the chart 500, the estimated rotor temperature 502 can be seen to accurately track the measured rotor temperature 504 over an extended time interval (note the time reference (in seconds) along the X-axis). However, during a "hot start" (rapid Key Down and Key On) 508, estimated rotor temperature 502 is re-initialized to approximately the stator temperature at time reference 1678. Over a minute later (at time reference 1756) the estimated rotor temperature 502 is approximately 50° C. below the measured rotor temperature, which is already 200C. Ordinarily, the diagnostics of over rotor temperature should derate torque to 0 if the rotor temperature is above 200 C. However, the estimated rotor temperature is only 150C. In this case, if high (or full) torque is continuously applied to the electric motor by the user during this time interval (for example, rapid acceleration on to a highway), the electric motor 112 (FIG. 2) could overheat, potentially leading to a reduction in the operational life of the electric motor.

Figure 6:
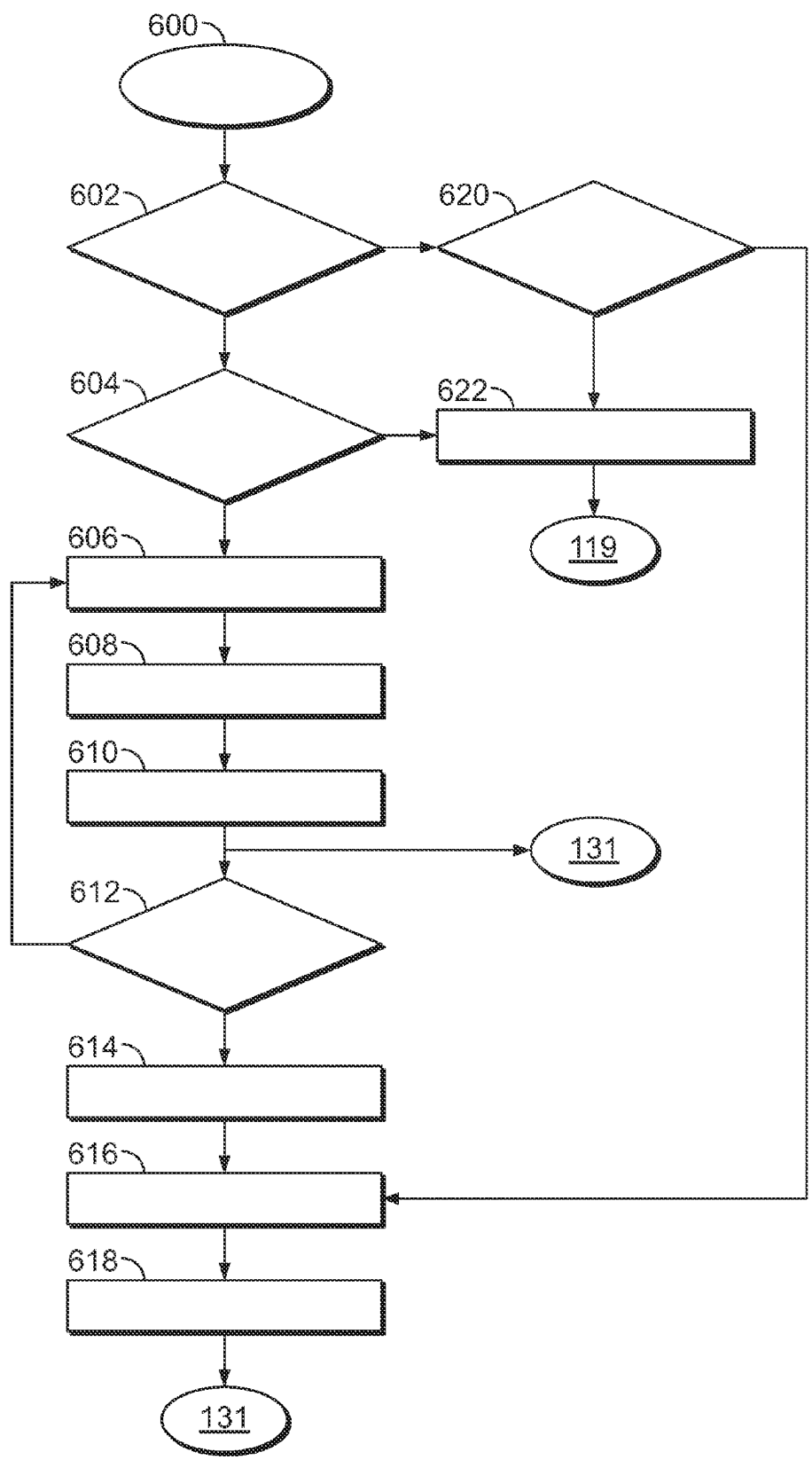
FIG. 6 is a flow diagram illustrating a rotor temperature estimation method in accordance with an exemplary embodiment.

Referring now to FIG. 6, a flow diagram illustrating a rotor temperature estimation method in accordance with exemplary embodiments of the present disclosure is shown. The routine begins 600 with electric motor start (or Key On), which resets a number of registers and parameters in the vehicle controller 102 (FIG. 2) and activates a fast-mode temperature estimation by setting a flag or a status bit in a register. Decision 602 checks for the flag and an affirmative determination causes decision 604 to determine whether the resistance rotor temperature estimator 130 (FIG. 2) is activated. As noted above, the resistance rotor temperature estimator will be activated during high torque conditions, and upon affirmative determination of such, step 606 increments a counter (the counter was reset to zero upon Key On), which is used to set a time period for the fast-mode temperature estimation. In step 608, the limit step size 438 (FIG. 4) is increased to a higher value (for example, the step is set to 0.01807 Ohms per second, which corresponds to 100 C rotor temperature change per second if the rotor resistance is 0.012 Ohms at 25 C), which allows the estimated temperature to rise more quickly than that with the normal (or nominal) value used when the fast-mode temperature estimation is deactivated and the normal-mode temperature tracking is active (i.e., fast-mode flag cleared). Step 610 uses the resistance rotor temperature estimator 130 (FIG. 2) with the increased limit step size to more rapidly cause the rotor temperature estimation to rise to approximate the actual rotor temperature (as will be illustrated in conjunction with FIG. 7) and provides this temperature estimate to the control module 132 as input 131 (see FIG. 2).

Decision 612 determines whether the counter has reached a maximum count value, which is set depending upon the processing speed of the controller 102 (FIG. 2) so that a time interval is defined to temporarily allow fast-mode temperature estimation of the rotor temperature. In some embodiments, a standard timer may be used instead of a counting routine. A negative determination loops the routine back to step 606, causing step 608 and 610 to be repeated until the determination of decision 612 is that the maximum count value has been reached. When a positive determination is made, then in step 614, the fast-mode flag is cleared, deactivating the fast-mode temperature estimation, and step 616 reduces the limit step size, restoring the normal (or nominal) value, thereby activating the normal-mode temperature estimation for continued operation (step 618) until the fast-mode flag again is set. Again, temperature estimates from the normal-mode temperature estimation become input 131 to the control module 132 of FIG. 2.

Returning to decision 602, if the determination is negative (fast-mode flag clear), the routine again determines 620 whether the resistance rotor temperature estimator is active (high torque). If it is, the normal-mode resistance rotor temperature estimator is used and its temperature estimate provided to the control module 132 as input 131. If the resistance rotor temperature estimator is not active, the thermal model temperature estimator 118 (FIG. 2) is used for low torque conditions (step 622). Also, if the fast-mode flag was set (affirmative determination from 602), but the resistance rotor temperature estimator was inactive due to a low torque condition (decision 604) and the thermal model temperature estimation is used (step 622) and its temperature estimate provided to the control module 132 as input 119.

Figure 7:
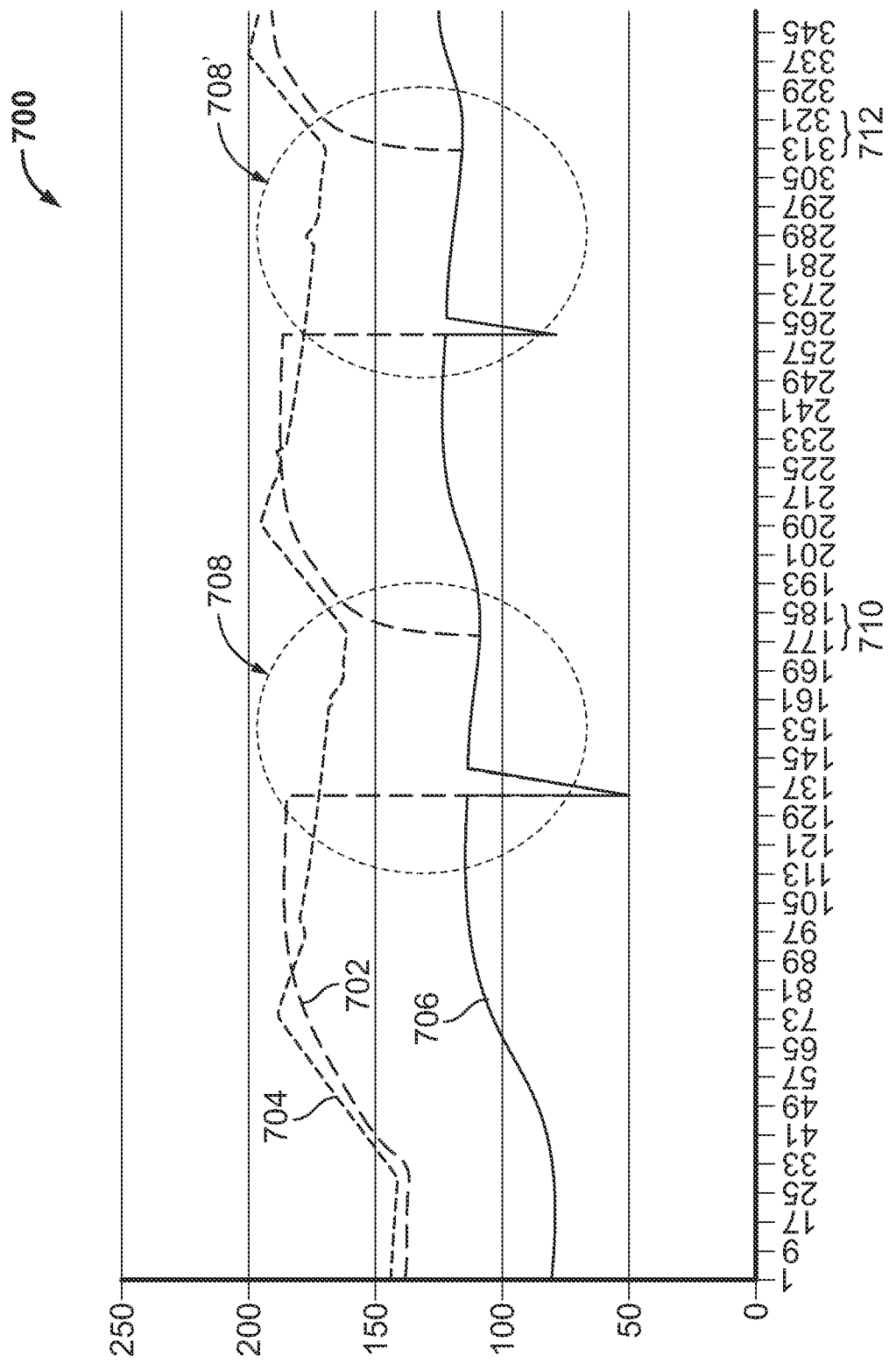
FIG. 7 is a chart illustrating rapid-mode rotor temperature estimation in accordance with an exemplary embodiment.

Referring now to FIG. 7, there is shown a chart 700 illustrating estimated rotor temperature 702, measured rotor temperature 704 and stator temperature 706 for the rotor temperature estimation of the present disclosure. From the chart 700, the estimated rotor temperature 702 can be seen to accurately track the measured rotor temperature 704 over the beginning time interval (note the time reference (in seconds) along the X-axis). However, during a "hot start" (rapid Key Down and Key On) 708 (and 708'), the fast-mode temperature estimation is activated, and in high torque situations, the limit step size 438 (FIG. 4) is increased (step 608 of FIG. 6), providing faster tracking of the rotor temperature estimation. For example during the hot start 708, the estimated rotor temperature 702 can be seen to rapidly rise during time interval 710 (8 seconds) to be within approximately 5° C. of the actual rotor temperature 704. Thereafter, the normal-mode temperature estimator is activated (i.e., the limit step size is restored to normal (step 616 of FIG. 6)) which accurately tracks the rotor temperature until the next hot start 708', where again the fast-mode temperature estimation is used (assuming high torque), and rapid recovery occurs during the time interval 712 (also 8 seconds). As noted above, the time interval may be measured in some embodiments using a timer, and in other embodiments using an incremented counter as discussed in conjunction with FIG. 6. The time period may be determined empirically for any particular implementation to allow the fast-mode temperature estimator time to recover to approximate the actual rotor temperature 704.

In any of the several embodiments, temporarily activating a fast-mode temperature estimator in high torque conditions, followed by normal-mode temperature estimation or continued operations in high torque conditions, affords the embodiments of the present disclosure an advantage of protection against overheating of the electric motor 112 (FIG. 2) of the vehicle 100 (FIG. 1).

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. In a vehicle having an electric motor, a method following a hot start of the electric motor, comprising:
   receiving, by a controller, torque commands for operating the electric motor following the hot start;
   estimating, in high torque conditions, a rotor temperature in the controller using a fast-mode of a resistance rotor temperature estimator for a time interval following the hot start, the fast-mode being activated by the controller by increasing a limit value limiting a temperature estimate increase for a rotor of the electric motor for the time interval causing the temperature estimate of the rotor to rise more rapidly compared to a normal-mode temperature estimator during the time interval;
   deactivating, by the controller, the fast-mode of the resistance rotor temperature estimator after the time interval by reducing the limit value to provide a normal-mode for the resistance rotor temperature estimator for the electric motor of the vehicle, the normal-mode rotor temperature estimator providing an estimate of the rotor temperature that rises less rapidly compared to the fast-mode temperature estimator; and controlling the electric motor of the vehicle, by the controller, using the fast-mode of the resistance rotor temperature estimator in high torque conditions during the time interval following the hot start and thereafter controlling the electric motor using the normal-mode of the resistance rotor temperature estimator.

2. The method of claim 1, wherein estimating the rotor temperature further comprises estimating the rotor temperature using the fast-mode of the resistance rotor temperature estimator in torque conditions greater than 5 nm.

3. The method of claim 1, wherein deactivating the fast-mode rotor temperature estimator further comprises, in low torque conditions, activating, by the controller, a thermal model rotor temperature estimator for the electric motor, and controlling the electric motor using the thermal model rotor temperature estimator.

4. The method of claim 1, wherein the time interval is measured by a counter reaching a maximum count value.

5. In a vehicle having an electric motor, a method following a hot start of the electric motor, comprising:

controlling an electric motor via a controller having a resistance rotor temperature estimator with a limit value limiting a temperature estimate increase for a rotor of the electric motor;

the controller temporarily increasing the limit value of the resistance rotor temperature estimator in high torque conditions for a time interval to provide fast-mode temperature estimation of the rotor temperature, the fast-mode temperature estimation providing rotor temperature estimates that rise more rapidly compared to a normal-mode temperature estimation during the time interval;

the controller reducing the limit value of the resistance rotor temperature estimator to restore normal-mode temperature estimation, the normal-mode rotor temperature estimation providing an estimate of the rotor temperature that rises less rapidly compared to the fast-mode temperature estimation; and controlling the electric motor of the vehicle, by the controller, using the fast-mode rotor temperature estimation during the time interval following the hot start in high torque conditions and thereafter controlling the electric motor using the normal-mode rotor temperature estimation.

6. The method of claim 5, wherein reducing the limit value further comprises reducing the limit value rotor temperature estimator in low torque conditions and activating a thermal model rotor temperature estimator in the controller for the electric motor in low torque conditions.

7. The method of claim 5, wherein temporarily increasing the limit value further comprises temporarily increasing the limit value of the rotor temperature estimator until a counter reaches a maximum count value.

8. The method of claim 5, wherein reducing the limit value further comprises restoring the limit value prior to increasing the limit value.

9. A vehicle, comprising:
an electric motor;
a thermal model rotor temperature estimator providing a first temperature estimate for a rotor of the electric motor;
a resistance rotor temperature estimator providing a second temperature estimate for the rotor of the electric motor, the resistance rotor temperature estimator including a limit value limiting a rotor temperature estimate increase for the second temperature estimate; and
a controller for the electric motor using the first temperature estimate in low torque conditions or the second temperature estimate in high torque conditions, the controller configured to temporarily increase the limit value of the resistance rotor temperature estimator for a time interval following a hot start of the electric engine and in the high torque conditions thereby providing a fast-mode rotor temperature estimate for the time interval to permit the second temperature increase to rise more rapidly during the time interval.

10. The vehicle of claim 9, the controller being further configured to control the electric motor using the first temperature estimate in low torque conditions.

11. The vehicle of claim 9, the controller being further configured to reduce the limit value of the resistance rotor temperature estimator after a time interval.

12. The vehicle of claim 9, the controller being further configured to temporarily increase the limit value of the rotor temperature estimator until a counter reaches a maximum count value.

* * * * *